3,078,246
FREEZE STABLE SYNTHETIC LATEX AND
METHOD OF MAKING SAME
John H. Musch, Silver Lake, Ohio, assignor to The Firestone Tire & Rubber Company, Akron, Ohio, a corporation of Ohio
No Drawing. Filed Oct. 3, 1957, Ser. No. 687,878
5 Claims. (Cl. 260—29.7)

This invention relates to the production of improved polymeric latices and, more particularly, relates to the production of improved polymeric latices for incorporation in water dispersion paints of enhanced freeze stability.

Due to their relative ease of application and relative freedom from odor, the water dispersion paints have enjoyed an ever-increasing popularity. As might be expected, however, development of this type of coating composition and its extension to new applications have been accompanied by a number of serious problems. Failure to solve one or more of these problems has prevented the full utilization of these otherwise excellent protective coatings.

One of the most vexing problems which has been encountered by the producers of water dispersion paints is that of freeze stability. Obviously, to enjoy wide commercial utility, it must be possible to ship a paint to various sections of the country without being concerned with temperature changes. Obviously, it is also desirable to be able to store the paint in ordinary storage facilities without making provision for maintaining storage temperatures above the freezing level. When many of the otherwise excellent water dispersion paints now commercially available are frozen and subsequently thawed, the latex has been found to coagulate, with it being impossible to satisfactorily redisperse the latex to form a usable coating composition. Coagulation difficulties become particularly acute when the paint is subjected to several freeze-thaw cycles prior to application.

In testing and observing the performance of a wide variety of water dispersion paints, the art has empirically determined that, inter alia, the particle size of the latex employed is related to the freeze stability of the paint. It has been observed that as the particle size of the latex increases, the paint compounded therefrom normally becomes more resistant to coagulation and that less stabilizer is required to produce a paint capable of withstanding repeated freeze and thaw cycling. At first approach, therefore, it might appear that the simple solution to the difficulty attending freeze-thaw coagulation lies in employing latex of large particle size for compounding water dispersion paints. Regrettably, however, the art has not been able to develop a satisfactory emulsion polymerization process for producing latex of the desired particle size without obtaining excessive prefloc formation, especially when the latex comprises the polymer or copolymer of monovinyl aromatic compounds, conjugated diolefins, or the esters, amides and nitriles of acrylic or methacrylic acid.

The initial stages of an emulsion polymerization reaction are usually critical, both from the standpoint of latex particle size and prefloc formation. It has, therefore, generally been found necessary to stabilize the initial stages of the polymerization reaction with an emulsifier. It has been found that the addition of anionic emulsifiers, while decreasing the amount of prefloc, results in an excessive micelle formation which reduces particle size. On the other hand, the addition of nonionic emulsifiers greatly slows the reaction rate and produces undesirably large amounts of prefloc.

In view of these and other difficulties attending the production of synthetic latices by emulsion polymerization and the formulation of freeze-resistant paints therefrom, a primary object of this invention is an improved emulsion polymerization process for production of a polymeric latex having large individual particle size and enhanced freeze stability.

A further object of the invention is a process of producing a stable latex of increased particle size of a polymer or copolymer of monomers selected from the group consisting of monovinyl aromatic compounds, conjugated diolefins, and the esters, amides and nitriles of acrylic and methacrylic acid, without substantial formation of prefloc and with a commercially feasible reaction rate.

A particular object of the invention is a process for producing a stable, large particle latex of butadiene and styrene.

Another object of the invention is a freeze stable latex of increased particle size for incorporation in water dispersion paints.

A further object of the invention is a large particle size, freeze stable latex of an emulsion polymer of one or more monomers of the group consisting of the conjugated diolefins, the monovinyl aromatic compounds, and the esters, amides and nitriles of acrylic and methacrylic acids.

Another object of the invention is a latex of the copolymer of a conjugated diolefin and a monovinyl aromatic compound which, when incorporated in a water base paint, will promote enhanced freeze resistance.

A special object of the invention is a large particle size, freeze stable latex of an emulsion copolymer of butadiene and styrene.

An additional object of the invention is a water dispersion paint of enhanced freeze stability containing the latex of an emulsion polymer of one or more monomers of the group consisting of the conjugated diolefins, the monovinyl aromatic compounds, and the esters, amides and nitriles of acrylic and methacrylic acids.

An additional object of the invention is a water base paint containing the latex of a butadiene-styrene copolymer in which the latex is characterized by enhanced stability.

A still further object of the invention is a method for producing a water dispersed latex paint of enhanced freeze stability.

Additional objects of this invention will become apparent from the description of the invention as hereinafter set forth.

Generally described, the present invention comprises a freeze resistant latex of an aqueous emulsion polymer of at least one normally liquid ethylenically unsaturated monomeric compound polymerized in aqueous medium in the presence of an initial charge of a mixture of an anionic emulsifier and an oil soluble nonionic alkylaryl polyalkoxy alcohol having the structural formula:

$$RC_6H_4(OCH_2CH_2)_nOH$$

wherein R is an alkyl group having from 6 to 10 C atoms and $n$ is an integer from 2 to 5.

Desirably, from 0.05 to about 2 parts of anionic emulsifier and from 0.3 to about 1 part of nonionic emulsifier by weight per 100 parts of monomer will be initially charged to the polymerization system. If less than about 0.05 part of anionic emulsifier is initially charged, undesirable amounts of prefloc are obtained, while the initial charging of more than about 2 parts of anionic emulsifier results in an undesirable reduction in particle size of the latex. On the other hand, if less than about 0.3 part of nonionic emulsifier is initially charged, substantial particle size increase is not obtained. If more than about 1 part of nonionic emulsifier is initially charged, commercially acceptable reaction rates are not obtained and undesirably heavy prefloc formation occurs.

The polymerization reaction may be carried out either in an acid or alkaline system. However, since it is often inconvenient or undesirable to employ acid resistant equipment, it is preferred that the pH of the polymerization system be adjusted to a pH of between 7 and 12, preferably to a pH of between 8 and 10, by addition of an alkaline buffering agent. Any of the usual alkaline buffering agents may be employed, including borax, sodium bicarbonate, sodium acid phosphate, sodium tartrate, sodium oxalate, and the like.

The water soluble salts of persulfuric acid are desirably employed as catalysts in the emulsion polymerization systems of the invention. Although potassium and sodium persulfates are preferred, the other soluble salts, such as lithium and magnesium persulfates, may be employed. The persulfate desirably will be employed in concentrations of between about 1 and about 2 parts by weight per 100 parts of monomer. At persulfate concentrations below about 1 part, commercially satisfactory reaction rates are not obtained. At persulfate concentrations above 2 parts, the particle size of the latex becomes undesirably reduced.

The operative range for the proportion of water initially charged to the polymerization reactor is from about 100 to about 300 parts of water for each 100 parts of total monomers by weight. It is preferred to charge from about 110 to about 150 parts of water.

The reaction may be carried out at a temperature of between about 20° and about 150° C., although it is preferred to employ temperatures ranging between about 60 and about 90° C.

Although the preferred conjugated diolefin employed in accordance with the invention is 1,3-butadiene, other conjugated diolefins having from 4 to 6 carbon atoms may also be employed, such as isoprene and 2,3-dimethyl butadiene, 1,3-piperylene, and the like. While styrene is the preferred monovinyl aromatic compound employed in the invention, the nuclear substituted styrenes, such as ortho-, meta- and para-methyl styrenes; ortho-, meta- and para-ethyl styrenes; the various halostyrenes, alpha halostyrenes, vinyl naphthalene, vinyl pyridine, vinyl carbazole, and the like may be employed.

The esters, amides and nitriles of acrylic and methacrylic acid which may be employed in the invention include, without limitation, methyl, ethyl, propyl and butyl acrylate; methyl, ethyl, propyl and butyl methacrylate; acrylamide, methacrylamide; acrylonitrile and methacrylonitrile; and the like.

In the preferred embodiments of the process, latex and water dispersion paint copolymers of a conjugated diolefin and a monovinyl aromatic compound will be formed or employed. Especially preferred are the copolymers of 1,3-butadiene and styrene. In the preferred copolymers of the invention, from about 27 to about 39 parts of conjugated diolefin will be copolymerized in aqueous medium with from about 73 to about 61 parts by weight of monovinyl aromatic compound. When the esters, amides and nitriles are copolymerized with conjugated diolefins, they may be substituted for all or part of the monovinyl aromatic compound. Excellent terpolymeric latices for incorporation in particularly durable water dispersion paints may be prepared by emulsion polymerization of from about 27 to about 45 parts of conjugated diolefin, from about 3 to about 45 parts by weight of monovinyl aromatic compound and from about 25 to about 70 parts of an ester of acrylic or methacrylic acid.

The broad class of anionic emulsifiers as known to the art is operable in the invention. Preferred anionic emulsifiers are the alkali metal alkyl sulfonates, the alkali metal alkylaryl sulfonates, the rosin acid soaps and the fatty acid soaps. Especially preferred is a $-C_{10}-C_{20}$ alkyl sodium sulfonate sold under the trade name "Aquarex G".

The operable nonionic emulsifiers which may be employed in the initial charge are confined to the alkylaryl polyalkoxy alcohols covered by the structural formula above set forth. Particularly preferred as nonionic emulsifiers are Triton X-45 and Antarox A-401. Both Triton X-45 and Antarox A-401 are alkylaryl polyalkoxy alcohols wherein the alkyl group R is $C_8H_{17}$ in the case of Triton X-45 and $C_9H_{19}$ in the case of Antarox A-401 and the value of $n$ averages respectively 5 and 4. Alkylaryl polyalkoxy alcohols characterized by an $n$ value greater than 5 are inoperable in the invention since their use results in prohibitively low reaction rates and production of large amounts of prefloc.

If additional stabilization is desired during the course of the polymerization reaction, additional anionic emulsifier may be injected into the reactor in small amounts after fifty percent conversion is obtained in accordance with the disclosure of U.S. Patent 2,702,285 to Bebb. In any event, it is preferred to add additional emulsifier, either anionic or nonionic or both, after completion of the polymerization reaction and prior to admixture of latex and pigment to form a water dispersion paint. However, the increased particle size of the latex of the invention makes it unnecessary to add as much stabilizer as heretofore deemed necessary, either after fifty percent conversion or complete conversion, to obtain the desired stability.

Also embraced by the present invention is a water dispersion paint prepared by admixture of the latex prepared in accordance with this invention and a paint pigment. Typical paint pigments which may be incorporated with the latex of the invention to produce a water dispersion paint are titanium doxide, clay, silica, lithopone, mica, barium sulfate, talc and zinc sulfide. Various dyes and color pigments may also be included in the pigment formulation, including such materials as carbon black, iron oxide, cadmium yellows, phthalocyanines ultramarine, chromium oxides, umber and sienna. It is preferred to initially form a water dispersion of the pigments and then to carefully admix the latex and the water pigment dispersion. Since most paint pigments are hydrophobic in nature, a pigment dispersing agent will preferably be added. Such dispersing agents are known to the art and include the various water soluble soaps, the aliphatic and aromatic sulfonates, the sulfolignins, the aliphatic sulfates, various polyethers and ether-alcohol condensates. Hydrophilic colloidal dispersing agents such as casein, soya bean protein and other animal and vegetable proteins may also be employed. Water dispersible cellulosic derivatives such as methyl cellulose are also effective pigment dispersing agents in compounding the water dispersion paints of the invention.

Having generally disclosed the invention, specific illustrative embodiments are presented in the following examples. In the examples, the exemplified latices were prepared by emulsion polymerization in 28-ounce crown-capped bottles which were rotated end over end in a circulating water bath maintained at 70° C.

The freeze stability determinations were made by a standard process employed in the art. Thirty grams of dispersed pigment and 20 grams of aqueous polymer dispersion of about 45% solids content, stabilized as indicated, were weighed into ¼ pint metal cans. The viscosity of the resulting paint was adjusted by the addition of water until the paint in the cans possessed the indicated viscosity. This viscosity was measured by a conical brass cup having a capacity of 90 mms. and which had an orifice in the vertex of the cone 0.277 inch in diameter. Viscosity values were determined by filling the cup with paint and measuring the time in seconds required for the paint to flow through the cup orifice. The metal cans were then covered and placed in a freezing chamber held at a temperature of −10° C. for a period of 16 hours. The cans were then removed from the freezing chamber and the contents allowed to thaw at room temperature. When the paint had reached room temperature, it was observed in order to determine the freeze characteristics. If the latex had coagulated, the paint had failed the test. If the contents had not coagulated, freeze characteristics were evaluated by observing the viscosity and grain (floc) present. Increased viscosity and increased amounts of grain indicate decreasing freeze stability. When freeze characteristics had been observed after one freezing and thawing cycle, the cans were again covered and the contents subjected to succeeding identical cycles until the contents coagulated or exhibited poor stability or else had been subjected to four such freezing and thawing cycles. A measure of freeze stability is reflected by a paint which does not coagulate at the first cycle. Exceptional freeze stability is reflected by a paint which has a viscosity of no more than about 30 seconds and contains no grain after four freezing cycles. The amount of prefloc of the various latices was determined by filtering the latex through a 100-mesh stainless steel screen, washing the recovered prefloc, drying it at 70° C. and calculating the weight of the dry recovered prefloc on the basis of 100 grams of monomer. All parts, unless otherwise designated, are expressed in parts by weight per 100 parts of monomer.

EXAMPLE 1

The following recipe was prepared and polymerized:

| | |
|---|---|
| Butadiene | 37 |
| Styrene | 63 |
| Water | 135 |
| Aquarex G | 0.1 |
| $K_2S_2O_8$ | 1.45 |
| Borax | 0.6 |
| Triton X–45 | 1.0 |

The resulting latex contained only .5% prefloc and had an average particle diameter of 2700 Angstroms.

*Table I*

| Example | 2 | 3 | 4 | 5 | 6 | 7 |
|---|---|---|---|---|---|---|
| Butadiene | 37 | 37 | 37 | 37 | 37 | 37 |
| Styrene | 63 | 63 | 63 | 63 | 63 | 63 |
| Water | 135 | 135 | 135 | 135 | 135 | 135 |
| Aquarex G | 0.1 | 0.5 | 1.0 | 0.1 | 0.1 | 1.0 |
| $K_2S_2O_8$ | 1.3 | 1.3 | 1.3 | 1.3 | 1.3 | 1.3 |
| Borax | 1.6 | 1.6 | 1.6 | 1.6 | 1.6 | 1.6 |
| Triton X–45 | 1.0 | 1.0 | 1.0 | 0.5 | 1.0 | 0.5 |
| Percent Total Solids at 22¾ hrs | 28.3 | 39.4 | 43 | 35 | 35.2 | 43 |
| Percent Prefloc | 4.50 | 0.58 | 1.79 | 3.15 | 0.09 | 0.84 |
| Modal Particle Diameter, A | 3,340 | 2,940 | 2,040 | 3,000 | 2,390 | 1,960 |

In Examples 2–7 listed in Table I, the amounts of Aquarex G and Triton X–45 were varied while keeping the amounts of butadiene, styrene, water, potassium persulfate and buffer constant. From these examples, it will be seen that the reaction rate for polymerization is directly proportional to the amount of anionic emulsifier present and that the prefloc is inversely proportional to the amount of nonionic emulsifier employed. Additionally, it will be seen that the increased particle size of the latex is directly proportional to the ratio of nonionic emulsifier to anionic emulsifier. It further will be noted that while a ten-fold increase in the amount of anionic emulsifier from 0.1 to 1 part resulted in a reduction in the particle size of the latex from 3340 to 1960 Angstroms, even the smaller particle sizes were unusually large and may be employed in the production of a latex paint of high stability even after repeated freezing and thawing cycles. For example, the latex of Example 7 was compounded into a water dispersion paint and submitted to the freeze test with the following excellent results:

| Initial Viscosity | Viscosity After Freeze-Thaw Cycle | | | |
|---|---|---|---|---|
| | 1 | 2 | 3 | 4 |
| 9.5 | 11.8 | 12.2 | 12.8 | 14.7 |

Examples 8–11 are presented in Table II below to illustrate the effect of the concentration of nonionic emulsifier on freeze stability of the latex and to illustrate the preferred concentrations of both the anionic and nonionic stabilizers.

*Table II*

| Example | 8 | 9 | 10 | 11 |
|---|---|---|---|---|
| Butadiene | 37 | 37 | 37 | 37 |
| Styrene | 63 | 63 | 63 | 63 |
| $H_2O$ | 135 | 135 | 135 | 135 |
| Aquarex G | 1.0 | 1.0 | 1.0 | 2.0 |
| Triton X–45 | | .5 | .75 | .5 |
| $K_2S_2O_8$ | 1.3 | 1.3 | 1.3 | 1.3 |
| Borax | 1.6 | 1.6 | 1.6 | 1.6 |
| Percent Floc | .88 | 1.17 | 1.23 | .44 |
| Freeze Resistance: | | | | |
| Original Viscosity | 11.6 | 9.5 | 10.2 | 10.4 |
| 1st cycle | >30 | 11.8 | 12.4 | 17.8 |
| 2nd cycle | >45 | 11.0 | 11.6 | 22.8 |
| 3rd cycle | [1] TVTM | 10.8 | 11.4 | >25 |
| 4th cycle | | 11.5 | 12.4 | 30.0 |

[1] Too viscous to measure.

Examination of the above data will indicate that Examples 10 and 11 represent the preferred concentrations of the anionic and nonionic stabilizers. The latex produced by both of these examples had excellent freeze resistance and only a limited amount of prefloc was produced.

In Examples 12 through 16, presented in Table III below, the amount of anionic stabilizer has been maintained at 1% and the amount of nonionic stabilizer has been maintained at 0.5%. The amounts of butadiene, styrene and water were also maintained constant. The amounts of persulfate catalyst and buffer have been varied as indicated.

*Table III*

| Example | 12 | 13 | 14 | 15 | 16 |
|---|---|---|---|---|---|
| Butadiene | 33 | 33 | 33 | 33 | 33 |
| Styrene | 67 | 67 | 67 | 67 | 67 |
| Water | 125 | 125 | 125 | 125 | 125 |
| Aquarex G | 1.0 | 1.0 | 1.0 | 1.0 | 1.0 |
| Triton X–45 | .5 | .5 | .5 | .5 | .5 |
| $K_2S_2O_8$ | 1.3 | 1.4 | 1.5 | 1.6 | 1.8 |
| $K_4P_2O_7$ | .6 | .65 | .69 | .74 | |
| Borax | | | | | .83 |
| Percent Prefloc | .16 | .58 | .58 | .64 | .40 |
| Final pH | 6.2 | 6.0 | 6.1 | 6.1 | 3.2 |
| Modal Particle Diameter (A) | 2,270 | 2,550 | 2,730 | 2,740 | 1,530 |

Examination of the data of Table III will indicate that the latex produced in Example 12 is superior from the standpoint of prefloc production. Examples 13–15 all produce highly satisfactory latex with tolerable amounts of prefloc. In Example 16 the upper limit of catalyst concentration is being approached as indicated by the acidity of the reaction mixture and the fact that the particle size has fallen off appreciably.

EXAMPLE 17

The latex of Example 12 was stabilized with 2% of Triton X–100 (similar to Triton X–45 except that $n$ is 6 to 30) and 2% of Triton X–45. The stabilized latex was then subjected to the standard freeze test with the following results:

| Initial Viscosity | Viscosity After Freeze-Thaw Cycle | | | |
|---|---|---|---|---|
| | 1 | 2 | 3 | 4 |
| 9.3 | 16.6 | 17.2 | 18.2 | 20.6 |

EXAMPLE 18

A latex paint was prepared from the latex of Example 12 which had been stabilized with 2% of Triton X-100 and 2% of the ammonium salt of linseed fatty acid. The freeze stability of the paint was similar to that of the latex.

EXAMPLE 19

The following recipe was emulsion polymerized:

| | |
|---|---|
| Butadiene | 37 |
| Styrene | 63 |
| $H_2O$ | 135 |
| $K_2S_2O_8$ | 1.3 |
| Borax | 1.6 |
| Aquarex G | 1.0 |
| Antarox A401 | 0.5 |

The freeze stability of the resulting latex was determined with the following results:

| Initial Viscosity | Viscosity After Freeze-Thaw Cycle | | | |
|---|---|---|---|---|
| | 1 | 2 | 3 | 4 |
| 8.6 | 12.8 | 13.6 | 14.8 | 15.4 |

From the foregoing examples, it will be seen that in accordance with the present invention, it is possible to prepare a large particle latex from conjugated diolefins and styrenes with minor production of prefloc and with completely acceptable reaction rates. Moreover, the particular combination of anionic and nonionic emulsifiers in accordance with the invention makes possible the production of a large particle size latex at a much higher initial emulsifier level than that currently believed possible. Moreover, the latex particles of the invention are more uniformly sized than those produced with the emulsifier systems of the prior art. Water dispersion points prepared by admixing these latices and conventional pigments yield protective coating compositions characterized by excellent freeze stability.

Since various modifications of the invention as disclosed will occur to those skilled in the art, it is intended that the present invention be limited only by the scope of the appended claims.

What is claimed is:
1. A freeze-stable latex of an aqueous emulsion copolymer of from 27 to 39 parts by weight of 1,3-butadiene and correspondingly 73 to 61 parts by weight of styrene copolymerized at a temperature of between about 20° C. and about 150° C. in the presence of from about 100 to 300 parts by weight of water, from about 1.0 to about 2.0 parts by weight of a water soluble salt of persulfuric acid, an initial charge of from 0.05 to about 2 parts by weight of an anionic emulsifier and 0.3 to about 1 part by weight of an oil soluble, nonionic alkylaryl polyalkoxy alcohol having the structural formula:

$$RC_6H_4(OCH_2CH_2)_nOH$$

wherein R is an alkyl group having from 6 to 10 carbon atoms and $n$ is an integer from 2 to 5 inclusive.

2. A latex in accordance with claim 1 wherein a relatively small amount of additional emulsifier was added after at least 50% polymerization conversion.

3. A freeze-stable water dispersion paint comprising the latex of claim 1 in admixture with paint pigment.

4. A process for preparing a freeze-stable water dispersion paint which comprises admixing the latex of claim 1 with water dispersed paint pigment.

5. A process for preparing a freeze stable latex which comprises polymerizing at a temperature of between 20° C. and about 150° C. from 27 to 39 parts by weight of 1,3-butadiene and correspondingly 73 to 61 parts by weight of styrene in the presence of from 100 to 300 parts by weight of water, from about 1.0 to about 2.0 parts by weight of a water soluble salt of persulfuric acid, an initial charge of from 0.05 to 2 parts by weight of an anionic emulsifier and 0.3 to about 1 part by weight of an oil soluble, nonionic alkylaryl polyalkoxy alcohol having the structural formula:

$$RC_6H_4(OCH_2CH_2)_nOH$$

wherein R is an alkyl group having from 6 to 10 carbon atoms and $n$ is an integer from 2 to 5 inclusive.

References Cited in the file of this patent

UNITED STATES PATENTS

| 2,386,764 | Zwicker | Oct. 16, 1945 |
| 2,605,242 | Betts et al. | July 29, 1952 |
| 2,799,662 | Ernst et al. | July 16, 1957 |
| 2,947,715 | Charlet et al. | Aug. 2, 1960 |

FOREIGN PATENTS

| 380,431 | Great Britain | Sept. 12, 1932 |

UNITED STATES PATENT OFFICE
CERTIFICATE OF CORRECTION

Patent No. 3,078,246                                  February 19, 1963

John H. Musch

It is hereby certified that error appears in the above numbered patent requiring correction and that the said Letters Patent should read as corrected below.

Column 5, Table 1, opposite "Aquarex G", Example 6, for "0.1" read -- 1.0 --.

Signed and sealed this 3rd day of September 1963.

(SEAL)
Attest:

ERNEST W. SWIDER                                   DAVID L. LADD
Attesting Officer                                     Commissioner of Patents